US009334054B2

(12) United States Patent
Hashberger et al.

(10) Patent No.: US 9,334,054 B2
(45) Date of Patent: May 10, 2016

(54) USE OF AIRCRAFT CABIN SURFACES TO GUIDE AIRFLOW AND SOUND

(75) Inventors: Frank E. Hashberger, Snohomish, WA (US); Sylvio A. C. Bravetti, Brier, WA (US)

(73) Assignee: BE Intellectual Property, Inc., Wellington, FL (US)

( * ) Notice: Subject to any disclaimer, the term of this patent is extended or adjusted under 35 U.S.C. 154(b) by 1142 days.

(21) Appl. No.: 13/089,261

(22) Filed: Apr. 18, 2011

(65) Prior Publication Data

US 2011/0256821 A1    Oct. 20, 2011

Related U.S. Application Data

(60) Provisional application No. 61/326,171, filed on Apr. 20, 2010.

(51) Int. Cl.
*B64D 11/00*    (2006.01)
*B64D 13/00*    (2006.01)

(52) U.S. Cl.
CPC .......... *B64D 11/0015* (2013.01); *B64D 11/003* (2013.01); *B64D 13/00* (2013.01)

(58) Field of Classification Search
CPC .. B64D 11/0015; B64D 11/003; B64D 13/00; B64D 2013/00
USPC ......................................................... 454/76
See application file for complete search history.

(56) References Cited

U.S. PATENT DOCUMENTS

| | | | |
|---|---|---|---|
| 2,251,660 A * | 8/1941 | Chipley | 454/108 |
| 3,330,506 A | 7/1967 | Robillard et al. | |
| 4,742,760 A | 5/1988 | Horstman et al. | |
| RE36,642 E * | 4/2000 | Ziadi | 362/471 |
| 6,764,046 B2 * | 7/2004 | Itakura et al. | 244/118.5 |
| 7,455,263 B2 | 11/2008 | Lau et al. | |
| 7,717,593 B2 * | 5/2010 | Clark | 362/471 |
| 2006/0207471 A1 * | 9/2006 | Todori et al. | 105/396 |
| 2007/0164158 A1 | 7/2007 | Buchholz et al. | |
| 2009/0103320 A1 * | 4/2009 | Clark | 362/470 |

(Continued)

FOREIGN PATENT DOCUMENTS

| CN | 1629503 | 6/2005 |
|---|---|---|
| EP | 0115059 A2 | 8/1984 |

(Continued)

OTHER PUBLICATIONS

EPO, ISR and Written Opinion for International Application PCT/US2011/033130 dated Nov. 4, 2011.
Search Report, Aug. 26, 2014, 3 pages.

*Primary Examiner* — Alissa Tompkins
*Assistant Examiner* — Phillip E Decker
(74) *Attorney, Agent, or Firm* — Fulwider Patton LLP

(57) ABSTRACT

An interior ceiling panel system includes a ceiling panel mounted in a ceiling area, a first airflow directing panel in a first side of the ceiling area defining an airflow passage, and a second airflow directing panel in a second side of the ceiling area, defining an eddy space. An airflow supply source introduces airflow into the ceiling area, and the second airflow directing panel provides an obstruction that creates an eddy in the eddy space that incoming airflow with air in the cabin. One or more speakers project sound energy upward toward the ceiling panel, which deflects sound energy to provide more uniform sound levels in the cabin.

13 Claims, 3 Drawing Sheets

(56) References Cited

U.S. PATENT DOCUMENTS

2010/0087131 A1* 4/2010 Stuetzer et al. ............... 454/76
2011/0255296 A1* 10/2011 Hashberger et al. .......... 362/471

FOREIGN PATENT DOCUMENTS

| EP | 0292033 A2 | 11/1988 |
| EP | 1167184 A2 | 1/2002 |

* cited by examiner

USE OF AIRCRAFT CABIN SURFACES TO GUIDE AIRFLOW AND SOUND

CROSS-REFERENCES TO RELATED APPLICATIONS

This application is based upon and claims priority from Provisional Patent Application No. 61/326,171, filed Apr. 20, 2010, which is incorporated by reference in its entirety herein.

BACKGROUND OF THE INVENTION

The present invention relates generally to interior systems for aircraft, and more particularly relates to interior ceiling panels for improved air flow mixing and sound projection in aircraft.

Aircraft ceiling panels have traditionally been designed as a single-purpose component independent of adjacent components. Air flow control nozzles in aircraft passenger cabins typically introduce air flow downwardly directly into the aircraft cabin passenger seating, which does not uniformly mix incoming air flow with cabin air, and produces undesirable drafts in aircraft passenger cabins. Sound is also typically projected directly from aircraft passenger cabin speakers facing downwardly in the aircraft cabin passenger seating, producing non-uniform sound levels in aircraft passenger cabins.

It would be desirable to provide a system for introducing airflow into aircraft passenger cabins that would thoroughly mix incoming airflow with cabin air, re-direct the airflow downward toward the seated passengers, and diffuse the airflow to prevent unwanted drafts in the aircraft cabin. It would also be desirable to provide a system for redirecting sound energy from aircraft passenger cabin speakers to provide more uniform sound levels in aircraft passenger cabins. The present invention meets these and other needs.

SUMMARY OF THE INVENTION

Briefly, and in general terms, the present invention provides for a system for providing improved air flow mixing and sound projection in the aircraft passenger cabin. A projection of the ceiling-bin architecture creates an eddy that thoroughly mixes the incoming airflow with the cabin air, re-directs the airflow downward toward the seated passengers, and diffuses the airflow to prevent unwanted drafts in the aircraft cabin. In addition, sound energy from one or more speakers is reflected from the ceiling panel to provide more uniform sound levels in the cabin.

Accordingly, the present invention provides for an interior ceiling panel system for aircraft having an aircraft passenger cabin with passenger seating and a ceiling area. The interior ceiling panel system includes a ceiling panel having a first side edge in a first side of the ceiling area, and a second side edge of the ceiling panel in a second side of the ceiling area. In a presently preferred aspect, the ceiling panel has a concave, downwardly curved configuration. A first overhead stowage bin can be provided in the first side of the ceiling area, and the first side edge of the ceiling panel is preferably disposed above, spaced apart from, and adjacent to the first overhead stowage bin, defining an airflow gap for airflow between the first side edge of the ceiling panel and the first overhead stowage bin.

A first airflow directing panel is mounted in the first side of the ceiling area below the first side edge of the ceiling panel, defining an airflow passage between the first airflow directing panel and the ceiling panel. In another presently preferred aspect, the airflow passage widens from the first edge of the first panel portion to the second edge of the first panel portion. In another presently preferred aspect, the first panel portion of the first airflow directing panel has a concave, downwardly curved configuration. In another presently preferred aspect, the first airflow directing panel can be a valance, and may include a lighting component. In another presently preferred aspect, the valance may include a speaker.

A second airflow directing panel is mounted in the second side of the ceiling area, defining an eddy space, and an airflow supply source is provided in the first side of the ceiling area to introduce airflow into the ceiling area. The first airflow directing panel also preferably includes a second panel portion connected to the opposing second edge of the first panel portion, with the second panel portion of the first airflow directing panel extending from the second edge of the first panel portion substantially to the first overhead stowage bin, so that airflow from the airflow supply source is directed substantially through the airflow passage between the first airflow directing panel and the ceiling panel. In a presently preferred aspect, the airflow supply source is disposed immediately adjacent to the ceiling panel, and provides a direction of airflow substantially parallel to the ceiling panel. The second airflow directing panel provides an obstruction at the second side of the ceiling area opposite from the airflow supply source, whereby introduction of airflow through the airflow passage to the eddy space creates an eddy in said eddy space that thoroughly mixes incoming airflow with air in the aircraft passenger cabin, and the ceiling panel and eddy redirect the incoming airflow downward toward the seated passengers, diffusing the incoming airflow in the air in the aircraft passenger cabin to prevent unwanted drafts in the aircraft passenger cabin. A second overhead bin can be provided in the second side of the ceiling area, and the second airflow directing panel is preferably disposed between the second edge of the ceiling panel and the second overhead stowage bin. In one presently preferred aspect, a first edge of a first panel portion of the second airflow directing panel abuts the second edge of the ceiling panel. In another presently preferred aspect, the first edge of the first panel portion of the second airflow directing panel is connected to the second edge of the ceiling panel. In another presently preferred aspect, the second airflow directing panel includes a second panel portion connected to a second opposing edge of the first panel portion of the second airflow directing panel, and the second panel portion of the second airflow directing panel extends between the second edge of the first panel portion substantially to the second overhead stowage bin.

In another presently preferred aspect, the interior ceiling panel system includes a speaker system including one or more speakers oriented to project sound energy upward toward the ceiling panel. In a presently preferred aspect, the one or more speakers include a first speaker mounted to the first panel portion of the first airflow directing panel configured to project sound energy toward the ceiling panel. The one or more speakers can also include a second speaker mounted to the first panel portion of the second airflow directing panel configured to project sound energy toward the ceiling panel. The ceiling panel operates as a sound reflector to deflect sound energy from the one or more speakers to the first and second sets of passenger seats on either side of the aisle to provide more uniform sound levels in the aircraft passenger cabin. The one or more speakers can alternatively be mounted in valances.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 2:
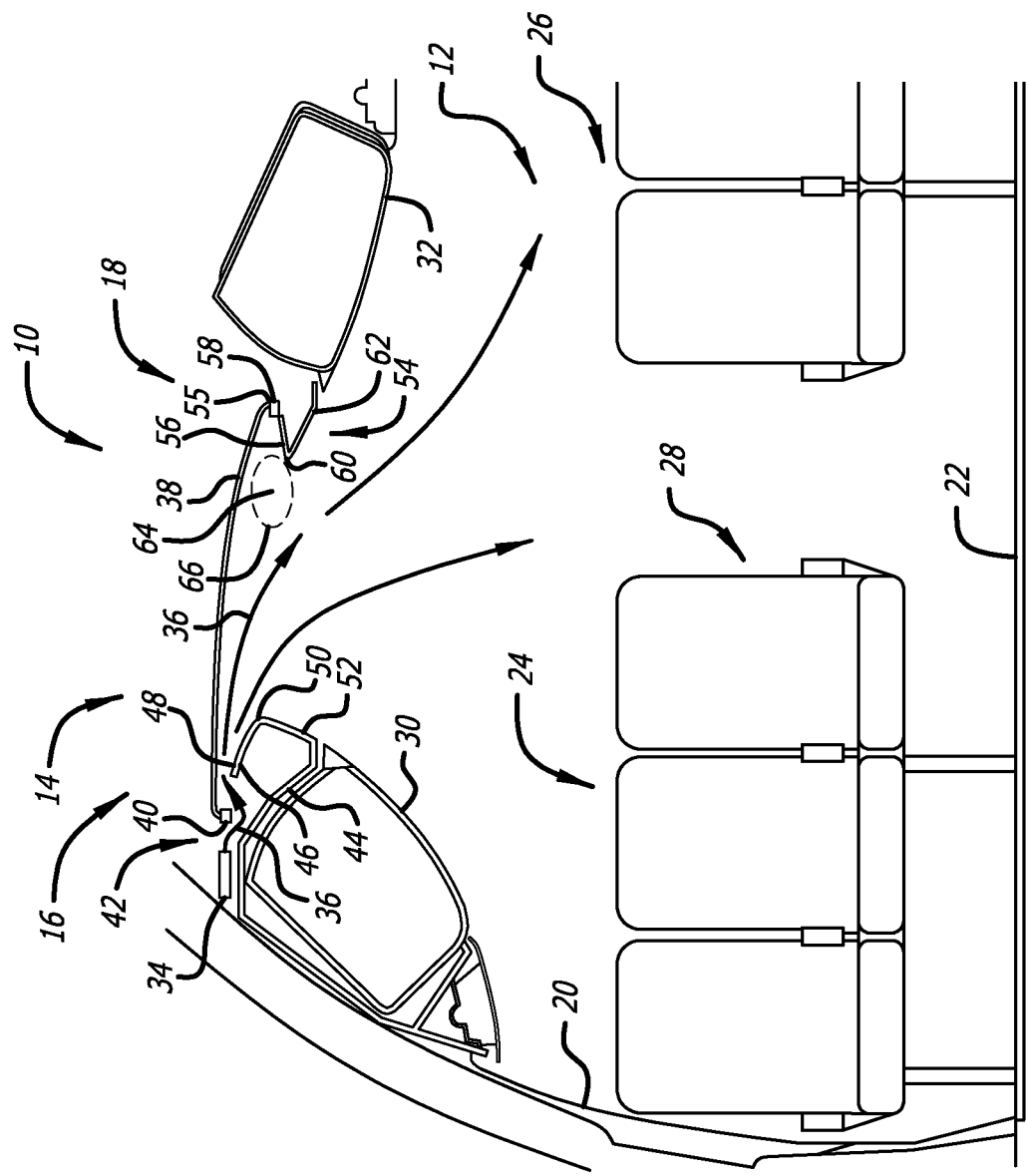
FIG. 2 is a schematic diagram of a cross-sectional view illustrating airflow control in an aircraft cabin using a ceiling panel and associated ceiling valences of FIG. 1.
Figure 3:
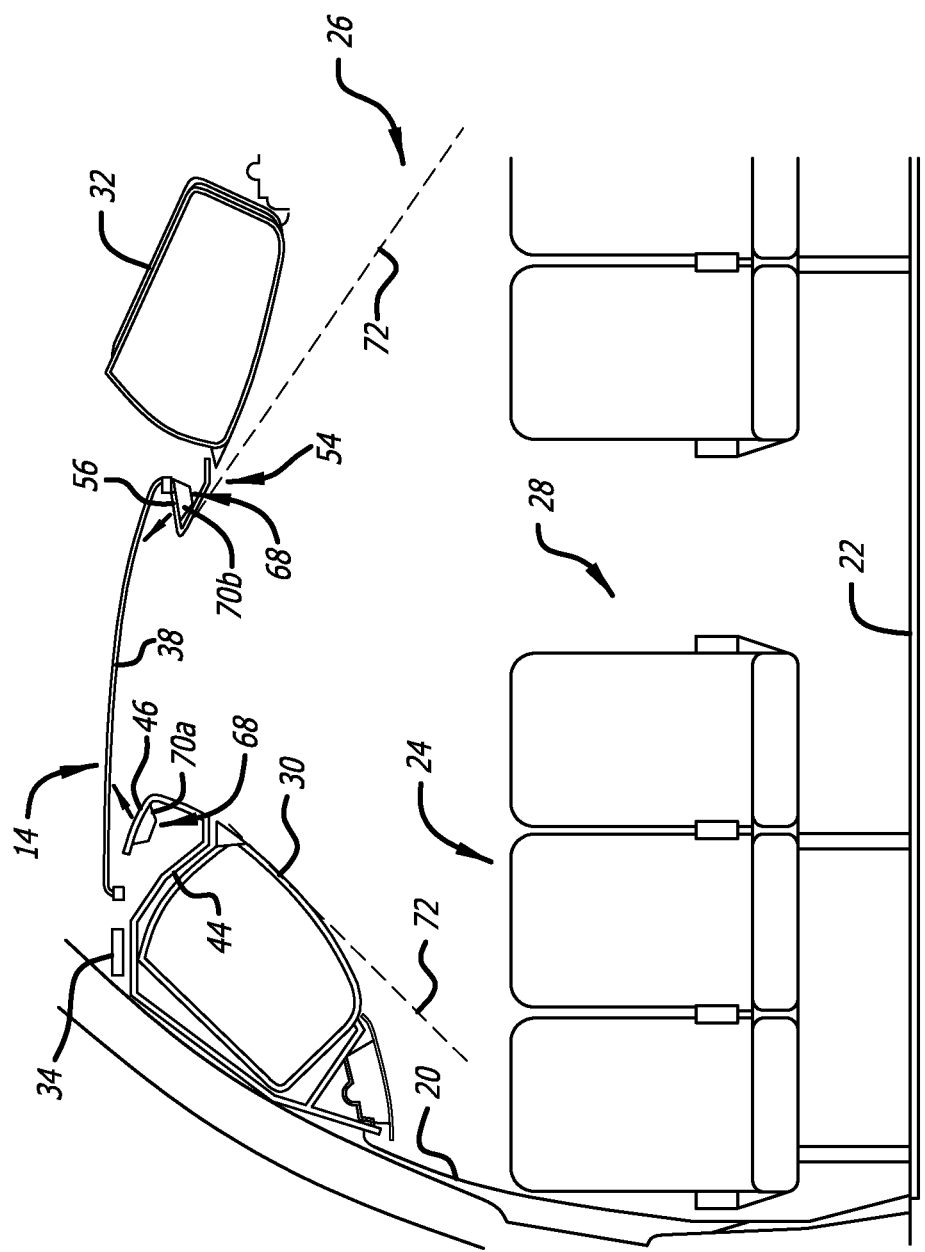
FIG. 3 is a schematic diagram of a cross-sectional view illustrating speaker placement and reflection of sound in an aircraft cabin using a ceiling panel and associated ceiling valences of FIG. 1.

Referring to the drawings, which are provided by way of example, and not by way of limitation, the present invention provides for an interior ceiling panel system with a ceiling panel mounted in an aircraft cabin, and a plurality of secondary panels mounted in the aircraft cabin in spaced relationship with the ceiling panel. As is illustrated in FIGS. 2 and 3, the present invention provides for an interior ceiling panel system 10 for an aircraft passenger cabin 12 having a ceiling area 14, with a first side 16 of the ceiling area and a second side 18 of the ceiling area. The aircraft passenger cabin also typically includes sidewalls 20, a floor 22, with a first set of passenger seats 24, a second set of passenger seats 26, and an aisle 28 between the first and second sets of passenger seats on the floor of the aircraft passenger cabin. The aircraft passenger cabin typically also includes a first overhead stowage bin 30 generally in the first side of the ceiling area, and a second overhead stowage bin 32 generally in the second side of the ceiling area.

An airflow supply source 34 is preferably provided in the first ceiling area, such as above the first overhead stowage bin, for example, and is configured to introduce airflow into the ceiling area of the aircraft passenger cabin. The airflow is preferably introduced immediately adjacent to and with a direction of flow 36 substantially parallel to a ceiling panel 38 mounted in the ceiling area, typically spaced apart from and generally extending between the first and second overhead stowage bins. In a presently preferred aspect, the ceiling panel has a concave, downwardly curved configuration. The ceiling panel has a first side edge 40 that is preferably disposed in the first side of the ceiling area, typically above, spaced apart from, and adjacent to the first overhead stowage bin, so as to define an airflow gap 42 for airflow between the first side edge of the ceiling panel and the first overhead stowage bin.

A first airflow directing panel 44 is preferably mounted in the first side of the ceiling area of the aircraft passenger cabin, such as between the ceiling panel and the first overhead stowage bin. The first airflow directing panel includes a first panel portion 46 having a first edge 48 and a second opposing edge 50, and a second panel portion 52 connected to the second opposing edge of the first panel portion. The second panel portion of the first airflow directing panel preferably extends from the second edge of the first panel portion substantially to the first overhead stowage bin, so that airflow from the airflow supply source is directed substantially through the airflow passage between the first airflow directing panel and the ceiling panel. The first edge of the first panel portion of the first airflow directing panel is closer than the second panel portion of the first airflow directing panel to the airflow supply source and the ceiling panel, so that the first panel portion of the first airflow directing panel defines an airflow passage between the first airflow directing panel and the ceiling panel that widens from the first edge of the first panel portion to the second edge of the first panel portion. The first panel portion preferably has a concave, downwardly curved configuration.

Figure 1:
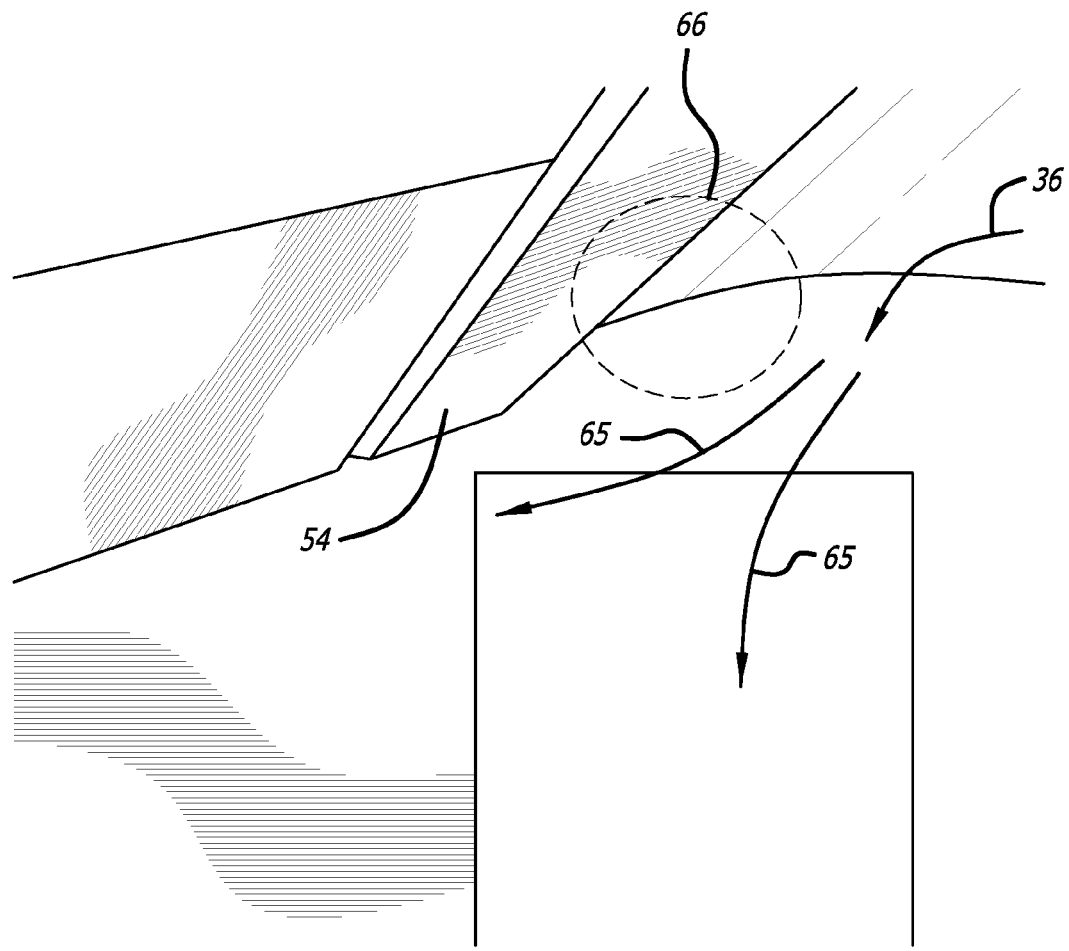
FIG. 1 is a schematic diagram illustrating airflow control in an aircraft cabin using a ceiling panel and associated ceiling valences according to the invention.

A second airflow directing panel 54 is preferably mounted in the ceiling area of the aircraft passenger cabin, such as between the second edge 55 of the ceiling panel and the second overhead stowage bin, and provides an obstruction at the second side of the ceiling area opposite from said airflow supply source. The second airflow directing panel includes a first panel portion 56 having a first edge 58 and a second opposing edge 60, and a second panel portion 62 connected to the second opposing edge of the first panel portion of the second airflow directing panel. The first edge of the first panel portion of the second airflow directing panel preferably abuts the second edge of the ceiling panel or is connected to the second edge of the ceiling panel. The second edge of the first panel portion is preferably spaced apart from the ceiling panel and extends generally toward the first ceiling area and downwardly, such as toward the first overhead bin portion, for example, to define an eddy space 64 adjacent to the second edge of the first panel portion and the ceiling panel. In a presently preferred aspect, the second panel portion of the second airflow directing panel extends between the second edge of the first panel portion substantially to the second overhead stowage bin. As is illustrated in FIG. 1, the introduction of airflow through the airflow passage and along the ceiling panel to the eddy space creates an eddy 66 in the eddy space that thoroughly mixes incoming airflow 65 with air in the aircraft passenger cabin, and the ceiling panel and eddy redirect the incoming airflow downward toward the seated passengers, diffusing the incoming airflow in the air in the aircraft passenger cabin to prevent unwanted drafts in the aircraft passenger cabin Referring to FIG. 3, the interior ceiling panel system can also include a speaker system 68 for the aircraft cabin, including one or more speakers 70a,b oriented to project sound energy upward toward the ceiling panel. A first speaker 70a can be mounted to the first panel portion of the first airflow directing panel configured to project sound energy toward the ceiling panel, and a second speaker 70b can be mounted to the first panel portion of the second airflow directing panel configured to project sound energy toward the ceiling panel, for example. Alternatively, the speakers can be mounted in one or more valances, which can also include lighting components. The ceiling panel operates as a sound reflector to deflect sound energy from the first and second speakers to the first and second sets of passenger seats on either side of the aisle to provide a sound coverage zone 72 providing more uniform sound levels in the aircraft passenger cabin.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. An interior ceiling panel system for aircraft, the aircraft including an aircraft passenger cabin having aircraft cabin passenger seating and a ceiling area having first and second sides, the interior ceiling panel system comprising:
   a ceiling panel having first and second ceiling panel side edges, said first side edge of said ceiling panel being disposed in the first side of the ceiling area, and the second ceiling panel side edge being disposed in the second side of the ceiling area;

an airflow supply source disposed in the first side of the ceiling area, said airflow supply source being configured to introduce an airflow into the ceiling area of the aircraft passenger cabin;

a first overhead stowage bin in the first side of the ceiling area, wherein said first ceiling panel side edge is disposed above, spaced apart from, and adjacent to said first overhead stowage bin, defining an airflow gap for the airflow between the first ceiling panel side edge and the first overhead stowage bin;

a second overhead bin in the second side of the ceiling area;

an airflow supply directing panel mounted in the first side of the ceiling area of the aircraft passenger cabin below the first ceiling panel side edge, the airflow supply directing panel including a first supply directing panel portion adjacent to said ceiling panel, said first supply directing panel portion having a first edge extending toward said airflow supply source and an opposing second edge extending toward said second side of said ceiling area, the first supply directing panel portion defining an airflow passage between the airflow supply directing panel and the ceiling panel;

an airflow obstructing panel mounted in the second side of the ceiling area of the aircraft passenger cabin, the airflow obstructing panel including a first airflow obstructing panel portion adjacent to said ceiling panel and a second airflow obstructing panel portion, said first airflow obstructing panel portion having a first edge abutting the second side edge of the ceiling panel and an opposing second edge, the first edge of the first airflow obstructing panel portion extending toward said second side of the ceiling area, the opposing second edge of the first airflow obstructing panel portion extending between said first and second ceiling panel side edges and extending toward said airflow supply source, the second airflow obstructing panel portion being connected to the second opposing edge of the first airflow obstructing panel portion, the second airflow obstructing panel portion extending from the opposing second edge of the first airflow obstructing panel portion substantially to the second overhead stowage bin, the first airflow obstructing panel portion of the airflow obstructing panel and the ceiling panel defining an eddy space between said airflow supply source and said second edge of the first airflow obstructing panel portion adjacent to the second edge of the first airflow obstructing panel portion and the ceiling panel, said airflow obstructing panel providing an obstruction at the second side of the ceiling area opposite from said airflow supply source configured to create an eddy in the eddy space that thoroughly mixes incoming airflow with air in the aircraft passenger cabin when the airflow is introduced through the airflow passage to the eddy space, and the ceiling panel and eddy being configured to redirect the incoming airflow downward toward the seated passengers, diffusing the incoming airflow in the air in the aircraft passenger cabin to prevent unwanted drafts in the aircraft passenger cabin.

2. The interior ceiling panel system of claim 1, wherein said ceiling panel has a concave, downwardly curved configuration.

3. The interior ceiling panel system of claim 1, wherein the airflow passage widens from the first edge of the first supply directing panel portion to the second edge of the first supply directing panel portion.

4. The interior ceiling panel system of claim 1, wherein said first supply directing panel portion of said airflow supply directing panel has a downwardly curved configuration.

5. The interior ceiling panel system of claim 1, wherein said airflow supply directing panel comprises a second panel portion connected to the opposing second edge of the first supply directing panel portion, said second panel portion of the airflow supply directing panel extending from the second edge of the first supply directing panel portion substantially to the first overhead stowage bin, so that airflow from the airflow supply source is directed substantially through the airflow passage between the airflow supply directing panel and the ceiling panel.

6. The interior ceiling panel system of claim 1, wherein the first edge of the first airflow obstructing panel portion of the airflow obstructing panel is connected to the second edge of the ceiling panel.

7. The interior ceiling panel system of claim 1, wherein said airflow supply source is disposed immediately adjacent to said ceiling panel, and provides a direction of the airflow substantially parallel to said ceiling panel.

8. The interior ceiling panel system of claim 1, further comprising a speaker system for an aircraft cabin, said speaker system including at least one speaker oriented to project sound energy upward toward the ceiling panel.

9. The interior ceiling panel system of claim 8, wherein said at least one speaker comprises a first speaker mounted to the first supply directing panel portion of the airflow supply directing panel configured to project sound energy toward the ceiling panel.

10. The interior ceiling panel system of claim 9, wherein said at least one speaker comprises a second speaker mounted to the first airflow obstructing panel portion of the airflow obstructing panel configured to project sound energy toward the ceiling panel, and wherein said ceiling panel operates as a sound reflector to deflect sound energy from the first and second speakers to first and second sets of passenger seats in the aircraft cabin passenger seating on either side of an aisle to provide more uniform sound levels in the aircraft passenger cabin.

11. An interior ceiling panel system for aircraft, the aircraft including an aircraft passenger cabin having aircraft cabin passenger seating and a ceiling area having first and second sides, the interior ceiling panel system comprising:

an airflow supply source disposed in the first side of the ceiling area, said airflow supply source being configured to introduce airflow into the ceiling area of the aircraft passenger cabin;

a ceiling panel having first and second ceiling panel side edges, said first ceiling panel side edge being disposed in the first side of the ceiling area, and the second ceiling panel side edge being disposed in the second side of the ceiling area;

an overhead bin in the second side of the ceiling area;

an airflow obstructing panel mounted in the second side of the ceiling area of the aircraft passenger cabin, the airflow obstructing panel including a first airflow obstructing panel portion adjacent to said ceiling panel and a second airflow obstructing panel portion, said first airflow obstructing panel portion having a first edge connected to the second side edge of the ceiling panel and an opposing second edge, the first edge of the first airflow obstructing panel portion extending toward said second side of the ceiling area, the opposing second edge of the first airflow obstructing panel portion extending between said first and second edges of said ceiling panel and extending toward said airflow supply source, the second airflow obstructing panel portion being connected to the second opposing edge of the first airflow obstructing panel portion, the second airflow obstructing panel portion extending from the opposing second edge of the first airflow obstructing panel portion substantially to the overhead stowage bin, the first airflow obstructing panel portion and the ceiling panel defining an eddy space between said airflow supply source and said second edge of the first airflow obstructing panel portion adjacent to the second edge of the first airflow obstructing panel portion and the ceiling panel, said airflow obstructing panel providing an obstruction at the second side of the ceiling area opposite from said airflow supply source configured to create an eddy in the eddy space that thoroughly mixes incoming airflow with air in the aircraft passenger cabin the airflow is introduced through the airflow passage to the eddy space, and the ceiling panel and eddy being configured to redirect the incoming airflow downward toward seated passengers, diffusing the incoming airflow in the air in the aircraft passenger cabin to prevent unwanted drafts in the aircraft passenger cabin.

12. The interior ceiling panel system of claim 11, wherein the first edge of the first airflow obstructing panel portion of the airflow obstructing panel abuts the second edge of the ceiling panel.

13. The interior ceiling panel system of claim 11, further comprising a speaker mounted to the first airflow obstructing panel portion of the airflow obstructing panel configured to project sound energy toward the ceiling panel, and wherein said ceiling panel operates as a sound reflector to deflect sound energy from the speaker.

* * * * *